(12) United States Patent
Charnock et al.

(10) Patent No.: US 8,819,021 B1
(45) Date of Patent: Aug. 26, 2014

(54) EFFICIENT AND PHASED METHOD OF PROCESSING LARGE COLLECTIONS OF ELECTRONIC DATA KNOWN AS "BEST MATCH FIRST"™ FOR ELECTRONIC DISCOVERY AND OTHER RELATED APPLICATIONS

(75) Inventors: Elizabeth B. Charnock, Foster City, CA (US); Steven L. Roberts, Foster City, CA (US)

(73) Assignee: Ernst & Young U.S. LLP, New York, NY (US)

( * ) Notice: Subject to any disclaimer, the term of this patent is extended or adjusted under 35 U.S.C. 154(b) by 489 days.

(21) Appl. No.: 12/021,259

(22) Filed: Jan. 28, 2008

Related U.S. Application Data

(60) Provisional application No. 60/897,610, filed on Jan. 26, 2007.

(51) Int. Cl.
*G06F 7/00* (2006.01)
*G06F 17/30* (2006.01)

(52) U.S. Cl.
USPC ............................ 707/738; 707/737; 707/748

(58) Field of Classification Search
USPC .......................................... 707/738, 730, 749
See application file for complete search history.

(56) References Cited

U.S. PATENT DOCUMENTS

| | | |
|---|---|---|
| 2001/0018698 A1 | 8/2001 | Uchino |
| 2003/0182310 A1* | 9/2003 | Charnock et al. ........... 707/104.1 |
| 2005/0027750 A1* | 2/2005 | Martin et al. .................. 707/200 |
| 2007/0294281 A1* | 12/2007 | Ward et al. .................... 707/102 |

FOREIGN PATENT DOCUMENTS

| | | |
|---|---|---|
| WO | WO 00/67159 | 11/2000 |
| WO | WO 01/53995 A1 | 7/2001 |
| WO | WO 01/57633 A1 | 8/2001 |
| WO | WO 01/69428 A1 | 9/2001 |

OTHER PUBLICATIONS

Song, W.W. et al, "A Semantic Similarity Approach to electronic document modeling and integration", Web Information Systems Engineering, 2000Proceedings of the First International Conference on Hong Kong, China Jun. 19-21, 2000, Los Alamitos, CA, USA, IEEE Comput. Soc., US, vol. 1, Jun. 19, 2000, pp. 116-124, XP010521844 ISBN: 0-7695-0577-5.

(Continued)

*Primary Examiner* — Robert Beausoliel, Jr.
*Assistant Examiner* — Hexing Liu
(74) *Attorney, Agent, or Firm* — Rajesh Vallabh; Foley Hoag LLP

(57) ABSTRACT

A method of more efficient, phased, iterative processing of very large collections of electronic data for the purposes of electronic discovery and related applications is disclosed. The processing minimally includes: text extraction, and the creation of a keyword search index, but may include many additional stages of processing as well. The method further includes: definition of an initial set of characteristics that correspond to "interesting" data, followed by the iterative completion of processing of this data based on a combination of user feedback on the overall relevance of the documents being processed and the system's assessment of whether or not the data it has recently selected to promote in the processing completion queue has the desired quality and quantity of relevant data. The process continues until all identified data has either been fully processed, or discarded at some intermediate stage of processing as being likely irrelevant. This has the result of effectively finishing the processing much earlier, as the later documents in the processing queue will be increasingly irrelevant.

8 Claims, 3 Drawing Sheets

(56) References Cited

OTHER PUBLICATIONS

Varlamis, I. et al. "Web document searching using enhanced flyperlink semantics based on xml" Database Engineering & Applications, 2001 International Symposium on Jul. 16-18, 2001, Piscataway, NJ, USA, IEEE, pp. 34-44, XP010554365.

Dunkel B. et al, "Customized metadata for Internet information" Knowledge-Based Intelligent Electronic Systems, 1997. KES '97. Proceedings., 1997 First International COnference on Adelaide, SA Australia May 21-23, 1997, New York, NY, USA, IEEE US, vol. 2, May 21, 1997, pp. 508-516, XP010242741, ISBN: 0-7803-3755-7.

Katashi Nagao Ed; Akita Sakurai et al, "Discussion Mining: Knowledge Discovery from Semantically Annotated Discussion Content"; New Frontiers in Atrificial Intelligence Lecture notes in COmputer Science; LNCS, Springer Berlin Heidelberg, BE, vol. 3809, 1900, pp. 158-168, XP019055847; ISBN: 978-3-540-71008-0.

Smith M A et al Association for Computing Machinery; "Visualization Components for Persistent Conversations" Chi 2001 Conference Proceedings. Conference on Human Factors in Computing Systems. Seattle, WA, Mar. 31-Apr. 5, 2001, Chi Conference Proceedings. Human Factors in Computing Systems, New York, NY : IEEE,US, Mar. 31, 2001, pp. 138-143, ISBN: 1-58113-327-8 Abstract; Figures 3-8 p. 141-p. 143.

Warren Sack: "Conversation Map: A Content-Based Newsgroup Browser" Proceedings of the 5th International Conference on Intelligent User Interfaces, [Onl Ine] 2000, pp. 233-240, New Orleans, USA ISBN: 1-58113-134-8 Retrieved From the Internet: URL: Http://Portal.Acm. Abstract p. 234 [Retrieved p. 237 on Feb. 14, 2008].

Donath J et al: "Visualizing Conversation" Systems Sciences, 1999. Hicss-32. Proceedings of the 32nd Annual Hawaii International Conference on Maui, HI, USA Jan. 5-8, 1999, Los Alamitos, CA, USA, IEEE Comput. Soc, US, Jan. 5, 1999, pp. 1-9.

\* cited by examiner

EFFICIENT AND PHASED METHOD OF PROCESSING LARGE COLLECTIONS OF ELECTRONIC DATA KNOWN AS "BEST MATCH FIRST"™ FOR ELECTRONIC DISCOVERY AND OTHER RELATED APPLICATIONS

CROSS REFERENCE TO RELATED APPLICATIONS

This application claims priority to U.S. Provisional Patent Application No. 60/897,610, filed on Jan. 26, 2007 and the disclosure of which is incorporated herein by reference in its entirety. In addition, this application is also related to application Ser. No. 11/497,199, filed on Jul. 31, 2006, which is now U.S. Pub. No. 2006-0271526, the disclosure of which is incorporated herein by reference in its entirety.

BACKGROUND

This application addresses an invention known as "Best Match First"™ to substantially improve both efficiency and the quality of the processing of very large collections of data, in the context of electronic discovery and related applications, including but not limited to investigation and compliance.

The volume of electronic information in both personal and corporate data stores is increasing rapidly. The data in question includes electronic mail (e-mail) messages, word-processed and text documents, database files, contact management tools, and calendars. As a result, it is safe to assume that the size of data presented in litigation or for investigation will also continue to substantially increase. This in turn has led to an ever increasing demand to efficiently process and subsequently review data sets that are increasingly in the 10 terabyte+ range. While there are many automated categorization and other techniques currently used to prioritize which data should be reviewed first, none take into account that since the data must first be processed before it can be reviewed with large scale collections, a good job of prioritizing the review cannot be done if the processing is not first effectively prioritized.

In normal usage in electronic discovery, and indeed in the field of Information Retrieval generally, data is de-duplicated, text is extracted from non-ASCII formats, and then an inverted word frequency index is built, all in one uninterrupted start-to-finish multi-stage process. This is because text extraction (where there are non-ASCII documents) and the construction of an inverted index are necessary in order to make the collection of documents searchable. However, when dealing with very large amounts of data, the process may be stopped prior to indexing for purposes of prioritizing items or types of items to be processed. Prior to the indexing step, less is known about the document than compared to after the indexing step. However, just the indexing step alone can take many days or even weeks when the size of the data is large enough and/or when hardware and network resources to process the data are limited, and do not permit substantial parallelization of effort. So there is a great benefit in making prioritization decisions based on the partial information that is available at an earlier stage in the process. Furthermore, because the method herein described is highly iterative in nature, the accuracy of these prioritization decisions will increase as data continues to be processed.

In one embodiment of the invention, the properties of each document, including its metadata and extracted text are placed in a special purpose Lightweight File System. One of the properties of this file system is that it can be very easily scanned for specific tokens. The time taken to dump the raw and extracted data into the file system as well as to perform a targeted scan of it represents only a small fraction of the time that it would take to index this data. The data must still be indexed, and for many applications the data is subject to many kinds of post-processing after indexing. This is because the index contains many important derived properties of documents that are necessary for many Information Retrieval applications, such as similarity assessments and complex search operators. But such sophisticated information is not necessary to make prioritization decisions of value. (Note that some variations of the method could likewise break after the indexing stage is complete, but prior to any subsequent post-processing steps such as discussion building as described in U.S. Pat. No. 7,143,091).

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Raw Data Becomes Accessible to the Processing Engine

The first step of the process involves making the electronic data accessible to the processing engine. The electronic data may be located on media where the media is directly connected to the processing engine in order to allow the processing engine to access the data for processing. The media can be, for instance, a plurality of hard drives or flash drives. Note that the processing engine may also be run on a network of electronic data where the processing engine includes a network spider to access the relevant data.

Figure 2:
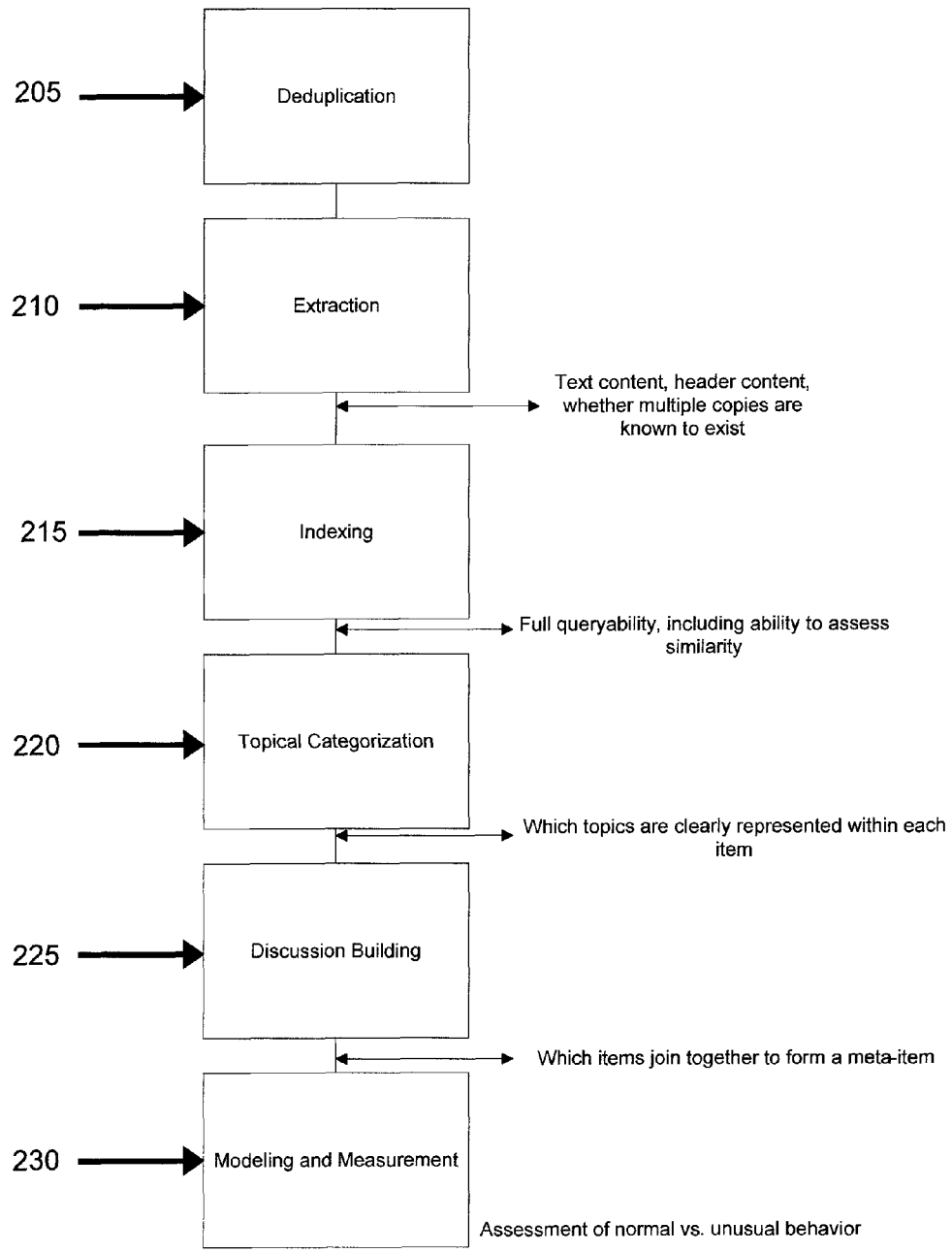
FIG. 2 shows a block diagram of another embodiment of information gained from different stages of processing which may be used with the present invention.
Figure 3:
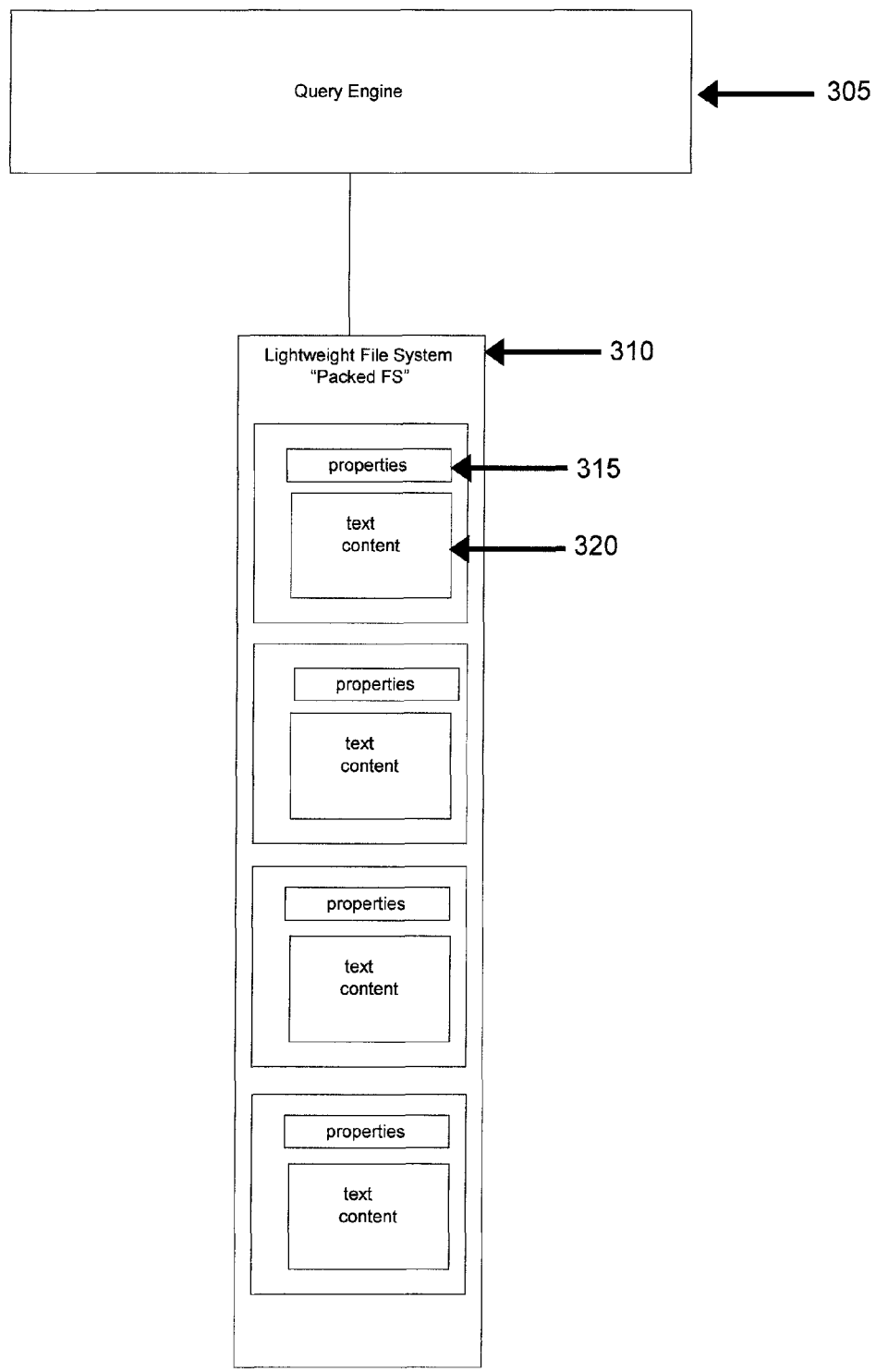
FIG. 3 shows a block diagram of the Lightweight File System and the Query Engine which may be used in accordance with another embodiment of the present invention.

As seen in FIG. 2, once the data has been de-duplicated [205] and extracted [210], in one embodiment it is loaded into a Lightweight File System [310], as seen in FIG. 3, which enables rapid scanning of tokens from both the content [320] and properties [315] of documents. This performs the basic queries on the data that are in turn needed to make assessments of the probable relevance of the data, by matching it to known profiles of "good" data. In some embodiments, a specialized query engine [305] designed for usage with such a Lightweight File System [310] may also be utilized.

In most embodiments, there is the concept of a "data set." These are sets of data that were in most instances either present on the same media or hardware, are associated with the same person(s) or topic(s), or were collected together. In any of these events, the presumption is that the data in the same data set is not a random collection of completely disparate items, but rather a set that is to some extent interconnected. There are therefore likely both computational and common sense motivations to process these interconnected data items together as a collective unit. The computational advantages come from both the fact that there is likely to be a somewhat greater homogeneity of relevance, and that the post-indexing processing as described in U.S. Pat. No. 7,143, 091 works more efficiently on interconnected data. The common sense advantage is that attorneys or investigators may be able to start examining the data on the basis of one or more of these characteristics.

User Input

Figure 1:
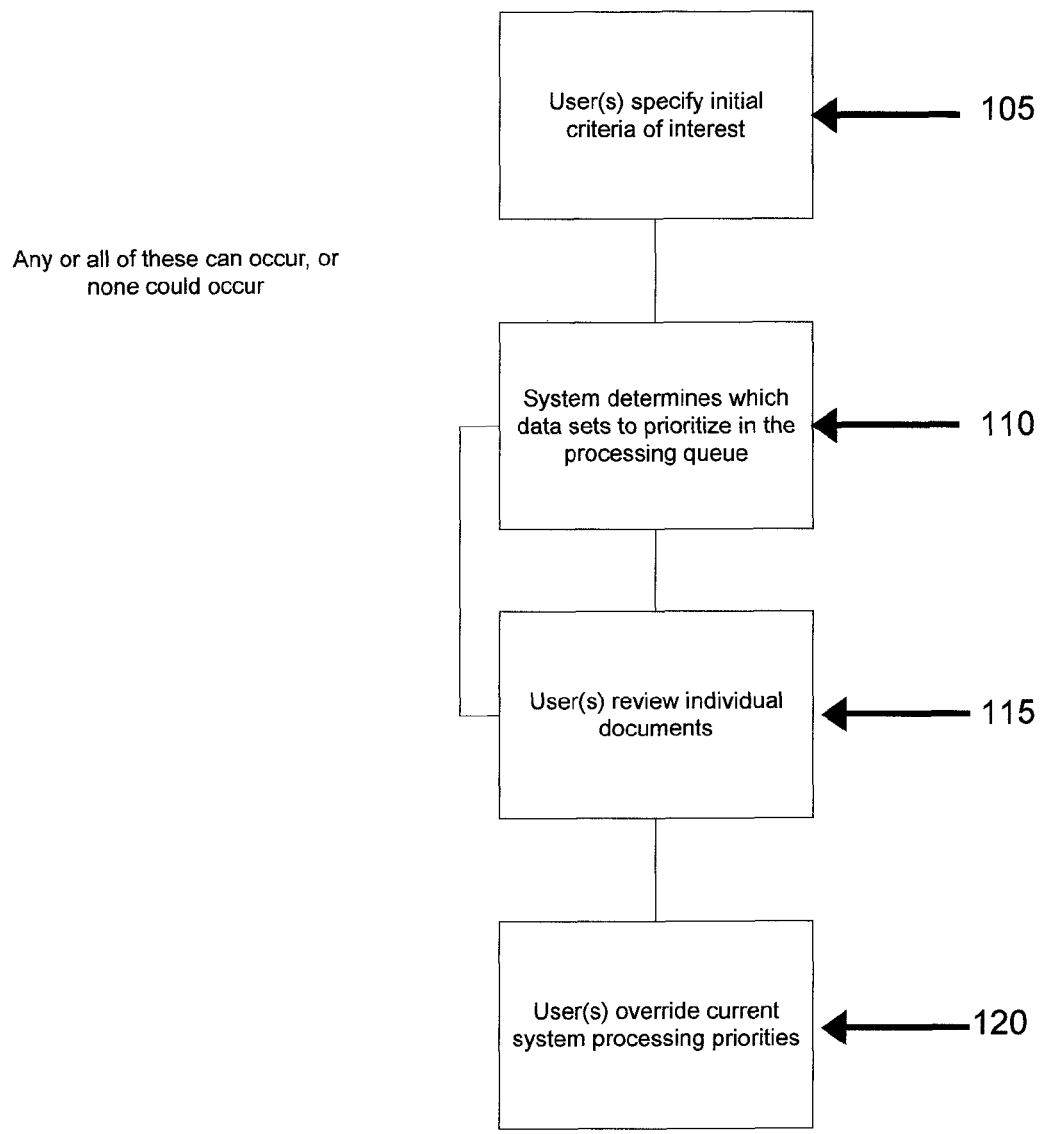
FIG. 1 shows a block diagram of one embodiment of the entire process of the invention.

In FIG. 1, upon the start of the process—before a single document has been processed—the user(s) may specify criteria which correlate to high relevance [105] in most embodiments. Some dimensions of relevance include but certainly are not limited to actors, custodians, time frame, and topical content. Actors are humans or computer system processes that contribute content to a discussion, as defined in U.S. Pat. No. 7,143,091. In most embodiments, these different dimensions are prioritized by the user, so that the system knows how to properly make tradeoffs when the data has one desired property, but lacks another. In many embodiments, the user may also specify how the data sets to be processed are defined. For example, by custodian, by department, by backup tape, or by server. This list is not limiting but exemplary. In most embodiments, all of the items in a data set are added to the processing queue at once. As data sets exit from the de-duplication and extraction stage, an evaluation is made by the system as to how well that data set matches the currently specified criteria, relative to other data sets that have been processed [110]. Of course, initially, no other data sets will have been processed. However, after the initial few data sets have been processed, there is a basis for comparison. In addition, in most embodiments, users would do either a complete or sample assessment of the initially processed data [115] that would outrank the initial criteria specified in the event of conflict. Different embodiments may model these user assessments in different well known ways including multidimensional modeling, closed item set-based calculations, clustering, support vector analysis, and other kinds of commonly used statistical analysis.

Users may continue to review documents throughout the entire process. This could be either because users have an independent requirement of some kind to review documents, or because users review documents in order to keep seeding the system, or for both of these reasons. Regardless of the motivation, the input from the users will automatically be fed back into the system [110, 115]. Note that it can never be known for sure that the process is permanently over, since additional data could always be loaded or located after all of the original data has completed processing. So the collection of the additional input from users should always be considered as having some value.

Note that while such initial starting points specified by the user(s) are likely to be non-optimal because they are uninformed by any empirical data, they are generally far better than starting the processing queue in a completely random order relative to the information being sought after. However, some embodiments could opt to forego this initial step.

System Input

The system may receive:

Initial seeding information

Anywhere from a small number of user review decisions to a very large number of user review decisions Items that a user has flagged as "interesting", wherein the process for a user to flag items as "interesting" is disclosed in application Ser. No. 11/497,199, filed on Jul. 31, 2006, which is now U.S. Pub. No. 2006/0271526

All of these things

None of these things

Specific user override instructions

In the worst case of "None of these things", the system can still use means of determining generically uninteresting data, such as files that correspond to well known MD5 hashes, spam, and other low interest items. By employing these means, the system can determine which data sets contain a higher proportion of substantive data, but not relevant data.

If the system receives only the initial specification of criteria of interest, but no subsequent user feedback, it will use these initial criteria as a static model in determining the relative goodness, and hence processing priority of the different data sets.

If the system receives input from users reviewing actual items, as previously noted, the criteria—or the relative priorities of these criteria—may change on the basis of user decisions. If no seeding information is provided, the model is built iteratively, as individual review decisions accrue.

In some embodiments, users may be permitted via a user interface to override the system's prioritization of specific data sets [120], or its scheme(s) for determining prioritization, as seen in FIG. 1.

Regardless of what kinds of inputs the system gets from the user(s), it has a number of different schemes including but not limited to topical categorization(s) and discussion building [220 & 225], as seen in FIG. 2, for determining which data sets are likely to yield the greater proportions of useful information. Some of these means can be utilized even before the start of any kind of processing. For example, if the data sets are partitioned on the basis of people, the system can walk or traverse the organization chart (presuming that it is inputted into the system) by either starting with initial custodians of interest, or by identifying custodians of interest via topics of interest, and assigning a high processing priority to the data sets corresponding to those custodians. Prior to indexing [215], communication analysis calculations can be done in order to provide an alternative structure for the system to traverse. For example, the alternative structure is created by ranking actors in a graph of actor-actor message exchanges and assigning priority to data sets by calculating an aggregated score using the ranks of actors appearing frequently in that data set. This is a simple example of a whole class of communication analysis methods used to build an alternative structure. Other embodiments may use additional methods or combine methods, abandoning one method if it seems to not yield consistently high value data sets.

As the processing progresses, the system builds a model [230] of who is creating the high value information, when, and in conjunction with whom. This model is subsequently leveraged by the system in various ways. For example, in the scenario of the network spider, the spider can automatically go and seek out the data from an actor who appears to generate or receive relevant content, even if he or she were not on the original list of custodians. It can likewise be used to assess gaps in the data by different variables, such as time and actor identity.

The overall effect of this process is that lower value data is typically left for last, allowing the useful part of the processing to complete significantly sooner.

Subsequent to the completion of processing of each data set, the system determines whether any remaining electronic data must still be processed. The process stops at the point where the supply of data has been exhausted. Note that in the case of the networked spider, this would be the point at which the system fails to find further relevant chunks of data on the network according to the parameters currently in effect.

Assuming that there is data remaining to be indexed, the system will continue with the "Best Match First" process.

Implementation with Automated Review

The Best Match First method requires a system to take disparate and sometimes conflicting categorizations, and combine them to form a concrete scheme for ranking data sets for collection and processing. To do this, the system can use the automated review algorithm described in U.S. Pub. No. 2006/0271526, application Ser. No. 11/497,199, filed on Jul. 31, 2006. The algorithm in this patent is based on computing a data structure (a lattice of closed item sets) commonly used in Data Mining. The novelty of using this lattice algorithm with the Best Match First method is the exploitation of properties of the lattice in order to automatically produce data categorization rules that are fitted to user judgments on samples taken from a corpus.

Suppose the system has a number of categories of data, $C_1$ to $C_n$. In one embodiment these categories may correspond to groups specified by the user, and/or to groups the system itself proposes. Embodiments of the invention may base categories on custodian, date range, document type, whether a document matches a concept specified via ontologies, whether a document is a member of a cluster derived through data clustering, or any other properties of a document. The system needs to compare these properties to decisions made by reviewers on specific documents, to determine how to combine these categories in order to most effectively predict whether a document is "useful" (i.e. relevant to the matter being investigated). This situation is completely analogous to the situation in U.S. Pub. No. 2006/0271526, in which the system must decide how to combine various categories in order to choose which items are likely to be responsive.

Using the same methods (e.g. creating closed item sets from the categories $C_1$ to $C_n$ and finding a "fence" across the lattice created by these item sets which represents a rule for classifying items), the system can combine the categories to form a rule for predicting whether a given item will be useful. The goal is to enable the system to accurately model the decisions made by the human reviewers, and to have decisions be parsimoniously formed from the underlying categories. In one embodiment, the rule is evaluated against properties that are considered typical for members of a data set in order to determine whether the data set is likely to contain useful data items. Data sets for which the answer is yes, as in containing useful data items, will be prioritized for processing before data sets for which the answer is no, as in not containing any useful items. Another embodiment would evaluate the rule against a sample of randomly selected items taken from a data set. The results obtained for items in the sample would be used as the direct measure of the usefulness of a particular data set. Critical for any embodiment is that a set of categories is selected to represent the properties of a data set.

Note that in one embodiment, the rule derived in this way is calibrated to the reviewer decisions made up to a point in time. The quality of decisions made by reviewers are likely to change over time, either because of increasing familiarity with the data set or due to other changes in requirements and guidelines given to reviewers, or the interpretation of those requirements and guidelines. Thus, in one embodiment, the rule—which is the "fence" across the lattice—is periodically recomputed as the process continues.

The categorization process will also affect, and be affected by, the strategy used to collect the data. In one embodiment, in order to quickly narrow down the data sets to be collected, a sampling regime is incorporated into the algorithm used for network resource discovery. Some amount of the data collected in any time interval is sampled from random locations in the network. Thus, an aspect of the Best Match First approach is to use similarities between items collected from samples taken from various data sets to predict which data locations are likely to have the highest rate of interesting or useful documents. The system exploits regularities in the properties of items taken from a data set. For example, the documents in a server backup will likely have been created or edited within a particular, limited time span. Other examples might be that a server has documents mostly from a set of particular author(s), a server may be associated with only one group, office, or physical location.

At any point in time the data sets that have been collected and reviewed in the review process can be analyzed in a manner analogous to U.S. Pub. No. 2006/0271526. In one embodiment, a lattice structure of closed item sets is constructed over a set of categories formed of subsets of the reviewed items and scored for consistency with reviewer results. Other embodiments may measure consistency against any method of annotating the collected items. The purpose is to use representative items, as specified in embodiments listed above, to determine which uncollected data sets are likely to be the most useful and/or relevant. If it is determined that the representative items are similar to other data sets in the system in addition to the data set(s) that they were drawn from, additional sampling from those data sets may be performed in order to further prioritize the data.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration.

What is claimed is:

1. A method comprising:
  providing electronic data from a medium or a network;
  enabling the electronic data to be accessible to a processing engine;
  de-duplicating the electronic data;
  extracting the electronic data;
  loading the electronic data into a Lightweight File System, wherein the Lightweight File System performs rapid scanning of a plurality of tokens from the content and properties of the electronic data, and is aided by a query engine;
  determining, prior to indexing the electronic data, where to prioritize the electronic data in a processing queue by evaluating how well the electronic data matches a user specified criterion relative to other electronic data that have been processed based on inputs received from users relating to their review of the already processed other electronic data;
  indexing the electronic data;
  subjecting the electronic data to topical categorization to determine which topics are clearly represented in the electronic data;
  building discussions based upon the electronic data; and
  building a model of all the processed electronic data to measure and assess the source of high value information or gaps in the data with respect to different variables such as time and actor identity.

2. The method of claim 1, wherein said enabling the electronic data to be accessible to a processing engine comprises:
  directly connecting various media having electronic data to the processing engine to allow the processing engine to access the data for processing.

3. The method of claim 1, wherein said enabling the electronic data to be accessible to a processing engine comprises:
  permitting a network spider included on a processing engine to access the relevant data on a network of electronic data.

4. A method comprising:
inputting a user specified criterion which correlates to high relevance;
preparing a data set for processing;
de-duplicating the data set;
extracting the data set;
determining, prior to indexing the data set, where to prioritize the data set in a processing queue by evaluating how well the data set matches the user specified criterion relative to other data sets that have been processed based on inputs received from users relating to their review of the already processed other electronic data sets;
having a user do a complete or sample assessment of initially processed data sets that outranks the initial user specified criterion in the event of conflict;
permitting a user to override prioritization of specific data sets or its schemes for determining prioritization;
indexing the data set; and
iteratively repeating the process based on user feedback and the desired quality and quantity of relevant data until all data sets have been exhausted.

5. The method of claim 4, wherein said inputting a user specified criterion which correlates to high relevance comprises:
having a user specify actors, custodians, time frame, topical content, initial seeding information, a small or large amount of user review decisions, items the user has flagged as interesting, specific user override instructions, and how the data sets to be processed are to be defined by custodian, department, backup tape or server.

6. The method of claim 4, wherein said preparing a data set for processing comprises:
preparing interconnected sets of data that are present on the same media or hardware, are associated with the same person(s) or topic(s), or were collected together.

7. The method of claim 4, wherein having a user do a complete or sample assessment of initially processed data sets that outranks the initial user specified criterion in the event of conflict is generalized into a model, further wherein the model is selected from a group consisting of:
multidimensional modeling, closed item set-based calculations, clustering, support vector analysis, and other kinds of statistical analysis.

8. The method of claim 4, wherein iteratively repeating the process based on user feedback and the desired quality and quantity of relevant data until all data sets have been exhausted comprises:
iteratively attempting to find further relevant chunks of data on the network according to parameters currently in effect by using a network spider.

\* \* \* \* \*